United States Patent [19]

Lazenby

[11] 4,171,945

[45] Oct. 23, 1979

[54] FLUIDIZED BED

[75] Inventor: Terence M. Lazenby, Windlesham, England

[73] Assignee: The British Petroleum Company Limited, London, England

[21] Appl. No.: 828,181

[22] Filed: Aug. 26, 1977

[30] Foreign Application Priority Data

Aug. 26, 1976 [GB] United Kingdom ............... 35519/76

[51] Int. Cl.² ............................................ F23D 19/00
[52] U.S. Cl. .................................... 431/170; 110/245; 431/7
[58] Field of Search ...................... 431/7, 170; 110/245; 122/4 D; 432/58

[56] References Cited

U.S. PATENT DOCUMENTS

| | | | |
|---|---|---|---|
| 3,327,660 | 6/1967 | Biddle | 110/245 X |
| 3,633,887 | 1/1972 | Bechthold et al. | 431/170 X |
| 3,776,150 | 12/1973 | Evans et al. | 110/245 |
| 3,888,194 | 6/1975 | Kishigami et al. | 110/245 |
| 3,914,089 | 10/1975 | Desty et al. | 431/7 |

FOREIGN PATENT DOCUMENTS

| | | | |
|---|---|---|---|
| 1069729 | 5/1967 | United Kingdom | 431/170 |
| 1087528 | 10/1967 | United Kingdom | 431/170 |
| 1191939 | 5/1970 | United Kingdom | 431/170 |
| 1275143 | 5/1972 | United Kingdom | 431/170 |
| 1362656 | 8/1974 | United Kingdom | 431/170 |
| 1436123 | 5/1976 | United Kingdom | 431/170 |

*Primary Examiner*—Edward G. Favors
*Attorney, Agent, or Firm*—Morgan, Finnegan, Pine, Foley & Lee

[57] ABSTRACT

A fluidized bed furnace for consuming a liquid fuel in which there is a fluidization zone of increasing cross-sectional area adjacent to and downstream of the liquid fuel injection nozzles. This arrangement allows better dispersion of the oil and bed material giving more efficient combustion.

9 Claims, 4 Drawing Figures

FLUIDIZED BED

The present invention relates to fluidised beds and more particularly to fluidised bed furnaces.

A fluidised bed furnace is operated by blowing a combustible mixture of air and a fuel through a bed of inert particulate material to maintain the bed in a fluidised state. The fuel, which may be solid, liquid or gaseous, or a mixture, burns within the bed which is thereby maintained at an elevated temperature, e.g. in the range 700°–1000° C. The use of the term "fluidised bed furnace" is also intended to cover the use of a fluidised bed as a gasifier whereby partial reaction of a fuel and an oxygen containing gas produces a combustible gas which may be stored or burned at a point remote from the fluidised bed.

Fluidised bed furnaces are capable of very high heat outputs and good heat transfer characteristics.

Difficulties, however, have sometimes been encountered in burning liquid fuels, such as fuel oil in fluidised bed furnaces, since there is a tendency for bed accumulations to form under certain conditions which can upset the combustion characteristics of the furnace.

Our U.K. patent application No. 1149/74 discloses a distributor plate suitable for use in a fluidised bed furnace, said distributor plate comprising a chamber having a fuel inlet and an air tube passing through the chamber, the interior of the air tube being in communication with the chamber, one end of the air tube terminating in a head having outlets adapted to supply a combustible mixture including fuel and air to a fluidised bed furnace, there being a surrounding tube around the air tube, which surrounding tube has an air inlet and air outlet, the air outlet being adapted to supply air to a region of the fluidised bed beneath the head supplying the combustible mixture to the fluidised bed.

Under certain operating conditions particularly of fairly low fluidising velocities it has been found that, during operation of the fluidised bed using fuel oil, coke accumulations, probably due to inadequate fuel/bed material dispersion, occur which detract from fluidised combustion efficiency. This is particularly the case during use of fluidised beds under elevated pressure. The present invention is directed towards reduction of this problem and to enable a reduction in the number of oil nozzles per unit area.

Thus according to the invention, there is provided a fluidised bed furnace comprising a chamber, one or more injection nozzles for the supply of a liquid fuel air mixture, and one or more inlets for the supply of air for the fluidisation of the bed material, the chamber having a zone of increasing cross-sectional area adjacent to the fuel injection nozzles. The fuel/air injection nozzles preferably project into the chamber at some distance from the side of the chamber and the zone of increasing cross-sectional area preferably extends on all sides of the nozzle head.

In a first embodiment of the invention, the fluidised bed comprises one or more fuel injection nozzles, there being a single zone of increasing cross-sectional area adjacent to the fuel injection nozzle.

In the first embodiment of the invention, the single zone of increasing cross-sectional area adjacent to the fuel injection nozzle is preferably formed by the internal walls of the chamber which diverge adjacent to the fuel injection nozzle either immediately or after an initial vertical parallel section.

In the second embodiment of the invention, the fluidised bed has two or more fuel injection units, each unit comprising one or more fuel injection nozzles, each injection unit having a zone of increasing cross-sectional area adjacent to said unit.

In the second embodiment of the invention, the zone of increasing cross-sectional area adjacent to each fuel injection unit, preferably has the shape of an inverted regular truncated pyramid or cone. Alternatively the fuel nozzles may lie in channels having a V-shaped or truncated V-shaped cross-section. The channels may be parallel or concentric or in other suitable form.

It is believed that the reduction in the extent of agglomeration in the fluidised bed furnace is caused by the increased fluidisation air velocity in the regions of fuel injection (as compared to that in the main bed) caused by the reduced cross-sectional area of the fluidisation zone adjacent to the fuel injection nozzle. This increased fluidisation velocity gives a more violent agitation of the bed giving better fuel/air mixing with the bed material. The more violent agitation enables fewer oil nozzles to be used per unit of bed cross-sectional area whilst retaining a high combustion efficiency and only 1/10 to 1/15 of the number of nozzles may be required for the same total fuel oil flow in comparison to fluidised bed furnaces having a uniform cross-section. This decrease in the number of liquid fuel injection nozzles required per unit of bed cross-sectional area facilitates the use of removable nozzles in the fluidised bed. The use of removable nozzles in the bed allows individual nozzles to be removed for servicing, cleaning, repair etc. without requiring shut-down of the bed. The reduction in the number of nozzles per unit area of bed enables the use of the inherently more bulky and complicated removable nozzles. Our co-pending British Patent Application No. 37182/76 describes a suitable removable nozzle.

The term air which has been used hereinbefore in the specification is also intended to mean 'a fluidising gas containing oxygen'.

Preferably the distributor plate has a fuel nozzle density of 2 to 5 per square meter of projected bed area i.e. maximum bed area.

Although the invention is primarily designed for liquid fuels e.g. fuel oil, solid fuels or gaseous fuels may also be used. Further the bed may be operated at atmospheric pressure or under supercharged conditions i.e. above atmospheric pressure.

Fuel oil may be introduced into the fluidised bed by the climbing film techniques described in our co-pending British Patent Application No. 1149/74 and British Pat. No. 1,368,532. Alternatively, the oil may be introduced by conventional atomising nozzles penetrating into the chamber.

The bed itself comprises mineral particles of a size range and bulk density appropriate to the velocity of the fluidising gas. Suitable materials include broken refractory, sand, dolomite and limestone.

The furnace may also be used for gasification purpose. That is, the ratio of fuel/air supplied to the bed can be varied from sub-stoichiometric to excess air conditions. Thus the plate may be used to produce a low Btu fuel gas which may be consumed remote from the fluidised bed furnace.

The invention will now be described by way of example only with reference to FIGS. 1 to 4 of the drawings accompanying the specification.

Figure 1:
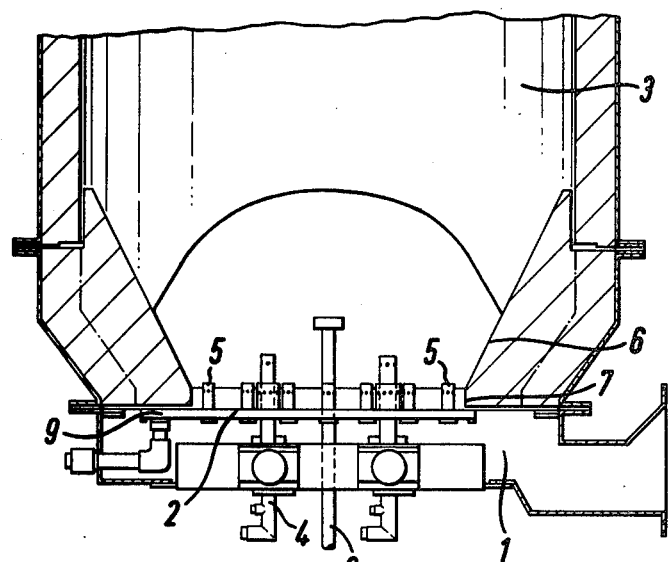
FIG. 1 is a vertical section through an oil injection fluidised bed furnace, with provision for coal feeding, having a divergent wall to create a single fluidisation zone of increasing cross-section.

The fluidised bed furnace comprises an air plenum chamber 1, a distributor plate 2 and a fluidised bed 3 of limestone and sand. The bed comprises mineral particles of a size range and bulk density appropriate to the velocity of the fluidising gas.

The fluidised bed furnace proper has the cross-section of a cylinder which tapers to a truncated pyramidal form towards the distributor plate 2.

The distributor plate 2 comprises a number of fuel oil/air admission nozzles 4 each of which is surrounded by a larger number of air only admission nozzles 5. (The operation of the oil/air admission nozzles is described in detail in our co-pending U.K. patent application No. 1149/74.

Figure 2:
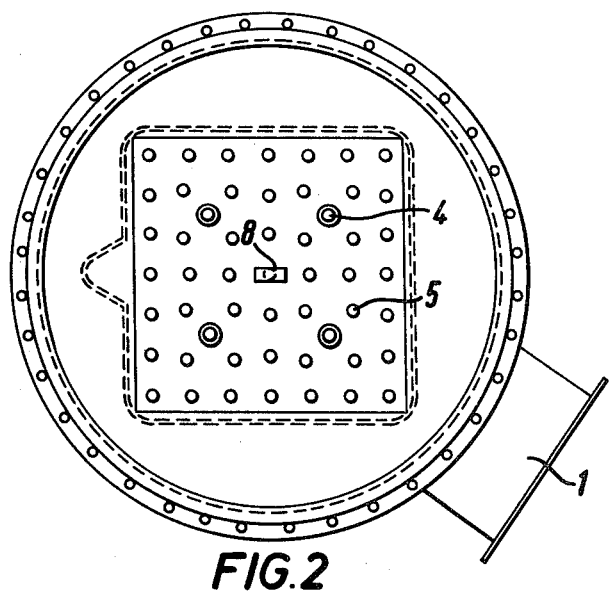
FIG. 2 is a plan view showing the distributor plate of FIG. 1.
Figure 3:
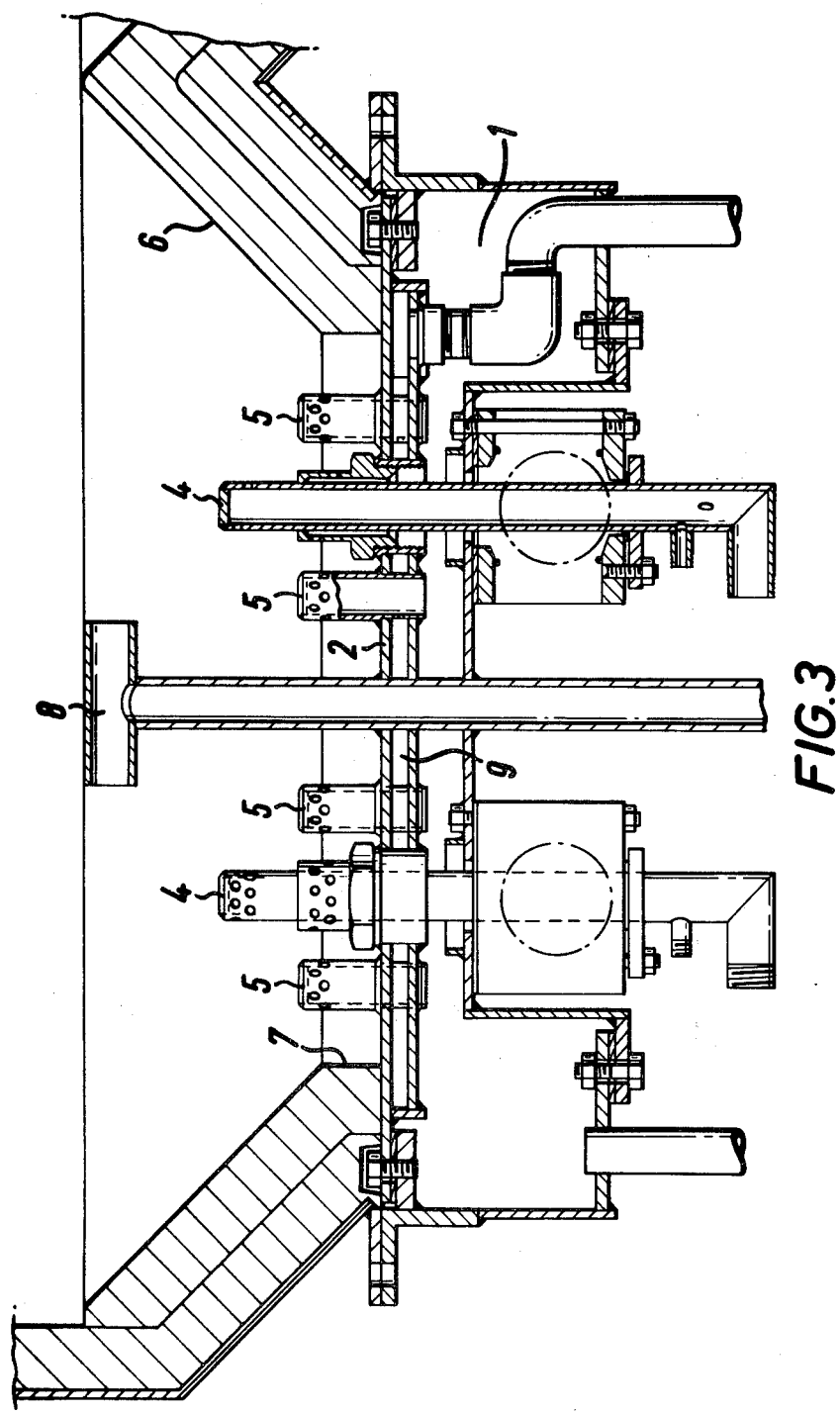
FIG. 3 is a vertical section through a multi-unit oil injection fluidised bed furnace, each unit having a fluidisation zone of increasing cross-sectional area adjacent to the injection nozzles.

The walls of the fluidised bed 3 taper towards the distributor plate 2 so as to form a fluidisation zone 6 which has an increasing cross-sectional area adjacent to the distributor plate 2. The walls may taper directly to the distributor plate 2 or may taper to a second vertical wall section 7 (as in FIGS. 1 and 3) adjacent to the distributor plate 2. This arrangement enables a higher fluidising velocity to be obtained near the point of oil admission to the fluidisation zone 6. Typically the velocity of fluidisation at the point of oil admission is two or three times greater than the velocity at the top of the divergent section. An optional coal injection nozzle 8 is also indicated in FIGS. 1 and 2.

To ignite the furnace, air is passed into the air plenum chamber 1 by means of a fan (not shown) and then subsequently through the nozzles 4 and 5 at a rate determined by the operating conditions required. Fuel gas e.g. propane, is supplied to the fuel gas chamber 9 of the distributor plate 2 and is subsequently mixed with air passing through nozzles 4 and 5. Thus a pre-mixed propane/air supply is supplied to the furnace bed 3. Ignition of the combustible mixture is either electrical or by means of a naked flame.

Generally less than 30 minutes is required after ignition to reach normal bed operating conditions circa 800° C. When these conditions are attained, the fuel gas supply is gradually reduced and the oil feed supply is switched in. Oil is fed to the nozzles 4 at a rate compatible with the air rate. The oil reaches the bed 3 under the influence of air from a separate supply passing along the interior of nozzles 4 causing the oil to form a climbing film along the inside walls. Thus the oil eventually reaches the outlet holes of the nozzles 4 and is consumed in the fluidised bed.

The viscosity of the oil introduced may be controlled by a heater (not shown)

A fluidised bed furnace according to the invention was operated on residual fuel continuously for a period of 100 hours. The furnace had the cross-section shown in FIG. 1 tapering from 43 inches diameter to 23 inches square adjacent to the oil nozzle outlets 4. The depth of the bed was 28 inches and the operation was performed at atmospheric pressure. The conditions and results for a distributor plate having four oil injection nozzles using the climbing film method of injection to the bed are shown in the following table.

Table

| | |
|---|---|
| Bed Operating Pressure | Atmospheric |
| Fuel | Residual fuel oil (viscosity 3500 sec) |
| Oil Injection Nozzles | Four |
| Bed Material | Limestone/sand |
| Bed Depth | 28 inches |
| Test Duration | 100 hours continuous |
| Fluidising Air Velocity at Nozzles | 10 ft/sec |
| Excess Air | 15 to 20% |
| Bed Temperature | 840°-890° C. |
| Combustion Efficiency | 99% |

Significantly reduced accumulations or deposits around the distributor were noted in comparison to beds not having the tapered wall configuration. Further, it was noted that the number of oil injection nozzles required for a given heat output was reduced (in the present case, the four oil injection nozzles were equivalent to a 60 oil nozzle distributor in a bed not having the tapered wall configuration operating under similar conditions with the same total fuel oil flow i.e. it is possible to use a much greater oil flow per nozzle without agglomerations occurring due to incomplete oil combustion.

Figure 4:
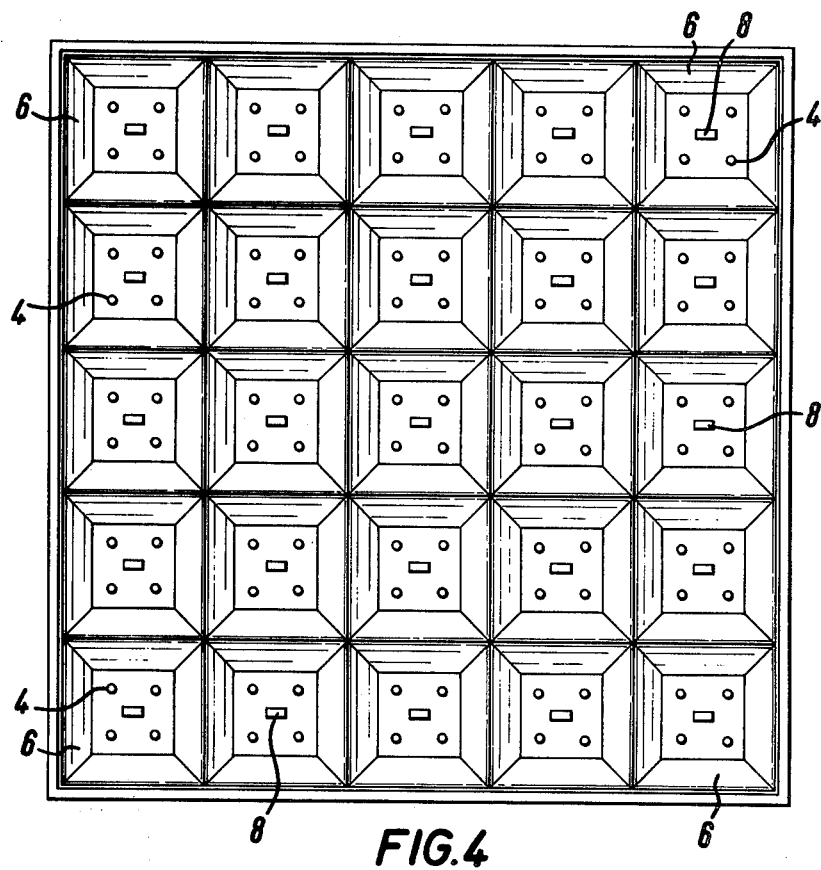
FIG. 4 is a plan view of the fluidised bed furnace of FIG. 3 showing the fluidisation zones in section of increasing cross-sectional area of a 5 by 5 module bed arrangement.

FIG. 4 illustrates a fluidised furnace in which the lower part of the fluidisation zone 3 is divided into 25 units having a truncated pyramidal cross-section. Each unit is 3 foot square at its maximum width and 2 foot square at its minimum width. The height of each unit is about 1 foot. This creates a fluidisation zone 9 having an increasing cross-sectional area adjacent to the fuel injection nozzles.

Each unit has four oil/air admission nozzles 4 (the distribution being as shown in FIG. 2) surrounded by air admission nozzles 5.

I claim:

1. A fluidized bed furnace comprising:

a chamber;

a base plate positioned at the bottom of said chamber.

a plurality of substantially vertical first tubes passing through said base plate into said chamber, each of said first tubes having an outlet nozzle positioned in said chamber;

means for introducing liquid fuel into said chamber through said first tubes;

means for supplying an oxygen containing gas into said first tube to entrain said liquid fuel introduced into said first tubes so that a mixture of said oxygen containing gas and said liquid fuel passes along said first tubes through said outlet nozzles and into said chamber;

a plurality of second tubes passing through said base plate into said chamber, each of said second tubes having an outlet in said chamber which is positioned beneath said outlet nozzles of said first tubes;

means for supplying an oxygen containing fluidizing gas into said chamber through said second tubes; and means for providing a region above said base plate of high fluidizing gas velocity, said region being adjacent to said vertical first tube outlet nozzles and comprising a plurality of substantially tapered projections positioned in said chamber above said base plate thereby dividing the region above said base plate into a plurality of cavities, each of said cavities containing at least one vertical first tube and the cross-section of each of said cavities substantially diverging in the direction away from said first tubes.

2. A fluidised bed furnace according to claim 1 in which said substantially tapered projections diverge away from said first tubes after a short initial substantially vertical section.

3. A fluidised bed furnace according to claim 1 in which said plurality of substantially tapered projections are each shaped in an inverted regular pyramid or cone, or an inverted regular truncated pyramid or cone.

4. A fluidised bed furnace according to claim 1 in which said substantially vertical first tubes lie in channels of V-shaped or truncated V-shaped section.

5. A fluidised bed furnace according to claim 4 in which the channels are parallel or concentric.

6. A fluidised bed furnace according to claim 1 in which the density of said substantially vertical first tubes is 2 to 5 per square meter.

7. A fluidised bed furnace according to claim 1 in which said substantially vertical first tubes are removable during fluidised bed operation.

8. A fluidised bed furnace according to claim 1 further including a fluidised bed in said chamber.

9. A fluidised bed furnace according to claim 8 wherein said fluidised bed is comprised of sand or limestone.

* * * * *